(12) United States Patent
Lee et al.

(10) Patent No.: US 9,573,318 B2
(45) Date of Patent: Feb. 21, 2017

(54) FLEXIBLE ROLL FORMING DEVICE

(71) Applicant: SUNGWOO HITECH CO., LTD., Busan (KR)

(72) Inventors: Mun Yong Lee, Busan (KR); Kuk-Rae Cho, Busan (KR)

(73) Assignee: SUNGWOO HITECH CO., LTD., Busan (KR)

( * ) Notice: Subject to any disclaimer, the term of this patent is extended or adjusted under 35 U.S.C. 154(b) by 43 days.

(21) Appl. No.: 14/140,009

(22) Filed: Dec. 24, 2013

(65) Prior Publication Data

US 2015/0027641 A1 Jan. 29, 2015

(30) Foreign Application Priority Data

Jul. 25, 2013 (KR) ........................ 10-2013-0088301

(51) Int. Cl.
*B29C 53/02* (2006.01)
*B21D 5/08* (2006.01)
*B29K 101/00* (2006.01)

(52) U.S. Cl.
CPC ................. *B29C 53/02* (2013.01); *B21D 5/08* (2013.01); *B29K 2101/00* (2013.01)

(58) Field of Classification Search
CPC ............. B21D 5/06; B21D 5/08; B21D 5/083; B21D 5/086; B21D 5/12; B21D 5/14; B29C 53/02
USPC .......................................... 72/169, 166, 173
See application file for complete search history.

(56) References Cited

U.S. PATENT DOCUMENTS

| | | | |
|---|---|---|---|
| 4,716,754 A * | 1/1988 | Youngs | 72/181 |
| 5,706,691 A | 1/1998 | Okamoto | |
| 5,722,278 A * | 3/1998 | Horino et al. | 72/181 |
| 6,289,708 B1 | 9/2001 | Keinanen | |
| 6,945,084 B2 * | 9/2005 | Bindernagel et al. | 72/239 |
| 6,993,953 B2 * | 2/2006 | Stupecky | 72/416 |
| 7,111,481 B2 * | 9/2006 | Green et al. | 72/181 |
| 7,536,889 B1 * | 5/2009 | Mueller | B21D 5/08 72/101 |
| 8,234,899 B1 | 8/2012 | Chuang | |
| 8,601,845 B2 | 12/2013 | Ingvarsson | |
| 9,174,258 B2 | 11/2015 | Freitag | |
| 2004/0244454 A1 | 12/2004 | McDonald | |
| 2010/0083722 A1 * | 4/2010 | Bachthaler et al. | 72/237 |
| 2011/0003113 A1 | 1/2011 | Lengauer | |
| 2011/0179842 A1 | 7/2011 | Freitag | |
| 2013/0276497 A1 | 10/2013 | Ingvarsson | |

FOREIGN PATENT DOCUMENTS

| | | |
|---|---|---|
| JP | 59-027723 | 2/1984 |
| JP | 08-309439 | 11/1996 |
| KR | 10-2010-0031972 | 3/2010 |

* cited by examiner

*Primary Examiner* — Moshe Wilensky
*Assistant Examiner* — Pradeep C Battula
(74) *Attorney, Agent, or Firm* — Lex IP Meister, PLLC

(57) ABSTRACT

A flexible roll forming device is provided. The roll forming device includes bases respectively disposed on opposite sides with respect to a process direction center line in a left/right direction of which rails are configured thereon along a lateral direction of the process direction center line, and upper and lower forming rolls configured to vary both positions in the lateral direction of processing, and angles from the process direction.

6 Claims, 8 Drawing Sheets

FLEXIBLE ROLL FORMING DEVICE

CROSS-REFERENCE TO RELATED APPLICATION

This application claims priority to and the benefit of Korean Patent Application No. 10-2013-0088301 filed in the Korean Intellectual Property Office on Jul. 25, 2013, the entire contents of which are incorporated herein by reference.

BACKGROUND OF THE INVENTION (a) Field of the Invention

The present invention relates to a flexible roll forming device. More particularly, the present invention relates to a flexible roll forming device for subjecting a blank material to roll forming of a formed beam having different widths and heights along a length direction.

(b) Description of the Related Art

In general, roll forming is a method including uncoiling a material coil and passing it through multi-stages of roll forming units each having one pair of an upper roll and a lower roll disposed on a line for forming a predetermined shape by successive bending. Further, the roll forming method is applicable to fabrication of straight-type formed products formed by bending into predetermined shapes, such as vehicle bumper beams or other members of a certain shape.

FIG. 1 illustrates a schematic view of a related art roll forming system with process steps thereof shown therein.

Referring to FIG. 1, in the related art roll forming method, an uncoiler 1, provided at a start of a process line for uncoiling a coil 10 supplied thereto, processes an uncoiling step S1 of feeding the coil.

A straightener 2 is provided next in a process direction after the uncoiler 1, to process a straightening step S2 for straightening the uncoiled coil 10 from the uncoiler 1 to be flat.

A press 3 is provided next in the process direction after the straightener 2, to process a piercing step S3 for forming holes for various purposes in the coil 10 fed from the straightener 2.

Roll forming units RU1-RU10 of about 10 stages are disposed next in the process direction of the press 3, to process a roll forming step S4 for successively bending the coil 10 being fed thereto through the uncoiler 1, the straightener 2, and the press 3 for roll forming a predetermined straight type of formed beam 20.

A cutting press 4 is provided next in the process direction after the roll forming units, to process a cutting step S5 for cutting the formed beam 20 to produce a formed product 30.

However, in view of the nature of the roll forming with the related art roll forming units, it has a drawback in that only formation of beams having a fixed cross-section along the length direction of the beams is possible, and formation of beams having different widths and heights along the length direction thereof is not possible.

Consequently, since formation of products of different modified cross-sections having different widths and heights along the length direction cannot be formed with the roll forming method, the products have been formed by applying multi-stage forming with a non-continuous process and long cycle time.

The above information disclosed in this Background section is only for enhancement of understanding of the background of the invention and therefore it may contain information that does not form the prior art that is already known in this country to a person of ordinary skill in the art.

SUMMARY OF THE INVENTION

An object of the present invention is to provide a flexible roll forming device for subjecting a blank material to roll forming of a formed beam having different widths and heights along a length direction.

In an exemplary embodiment of the present invention, a flexible roll forming device includes bases respectively disposed on opposite sides with respect to a process direction center line in a left/right direction of which rails are configured thereon along a lateral direction of the process, forward/backward moving means having a slide plate provided to be movable along the rails on the base, turning means rotatably provided to the slide plate, and roll forming means provided on the turning means to include an upper forming roll and a lower forming roll inclined with respect to the upper forming roll for subjecting a material fed thereto to flexible roll forming by using the upper and lower forming rolls while varying positions in the lateral direction of processing with the forward/backward moving means, and angles from a process direction with the turning means.

The forward/backward moving means may further include a forward/backward moving cylinder mounted on the base connected to the slide plate with an operation rod.

The turning means may include a turning reducer mounted to a center of the slide plate, a turning motor mounted under the turning reducer for supplying a torque, and a turntable mounted over the turning reducer so as to be turned by the torque from the turning motor.

Mounted on the slide plate for sensing a sensing dog mounted on one side of an underside of the turntable to sense a home position of the turntable with respect to the slide plate, and rotation limit positions in one direction and the other direction and forwarding a signal thereof.

A space portion may be formed within the base for the turning motor to be moved without interruption when the forward/backward is operated.

The roll forming means may include upper and lower plates, roll posts coupled to the upper and lower plates mounted to the turning means, upper and lower roll housings mounted to the roll posts to be movable in up/down directions; and a lower roll motor mounted to an outside of the lower roll housing connected to the lower forming roll passed through the lower roll housing.

The upper forming roll may be rotatably connected to a rotating bracket fixed to the upper roll housing through a slanted shaft, and has forming surfaces corresponding to an external circumferential surface and a side surface of the lower forming roll.

The roll forming device may further include adjusting bolts provided between the upper and lower plates and the upper and lower housings for adjusting and securing positions of the upper and lower roll housings, respectively.

An exemplary embodiment of the present invention can allow roll forming of a 3D formed beam having a modified cross-section with different widths and heights along a length direction of a blank having a straight portion, an expanded portion, and so on by configuring a multi-stage roll forming device for varying axis direction positions and angles of the upper and lower forming rolls.

Eventually, vehicle body members, frames, and beams having cross-sectional profiles of which widths and heights are different from one another along the length direction can be roll formed permitting minimization of following steps, such as welding, jointing, and the like, contributing to manufacture of lighter cars.

Particularly, during forming flange bent from a blank, each surface of the flange and the blank is in a rolling contact state with rollers, so that distortion of the blank may be prevented.

DESCRIPTION OF SYMBOLS

Figure 1:
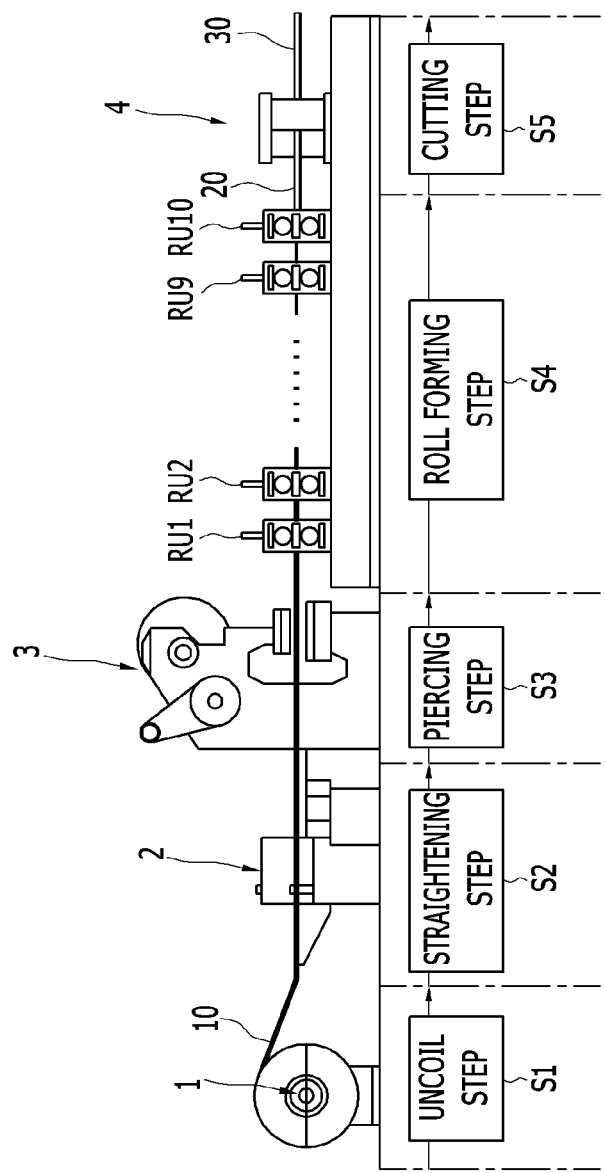
FIG. 1 illustrates a schematic view of a related art roll forming system, with steps thereof shown thereon.

100: flexible roll forming device
103: base
110: forward/backward moving means
120: turning means
130: roll forming means
105: space portion
105a: opening
107: rail
111: slide plate
112: slider
113: forward/backward moving cylinder
114: operating rod
121: turntable
122: turning motor
123: turning reducer
124: reducer shaft
125: sensor
126: sensing dog
131: roll post
132: adjusting bolt
133,134: upper and lower plates
135: rotating bracket
136: roll reducer
137: roll shaft
138: fixing plate
139: fixing nut
141: slanted shaft
143: forming surface
145: mounting column
147: mounting bolt
149: center pin
151: bolt
153: pin bolt
RH1,RH2: upper and lower roll housings
R1,R2: upper and lower forming rolls
RM: roll motor
B: blank
S: reference surface
F: flange
P1: straight portion
P2: expanded portion
P3: curved portion

DETAILED DESCRIPTION OF THE EMBODIMENTS

Hereinafter, an exemplary embodiment of the present invention will be described with reference to the accompanying drawings.

A thickness or a size of an element shown in a drawing can be exaggerated, omitted, or shown schematically for convenience or clarity of description.

Parts not relevant to the description are omitted for clarity of the description of an exemplary embodiment of the present invention, and the same or similar elements will be given identical reference numerals throughout the specification.

Figure 2:
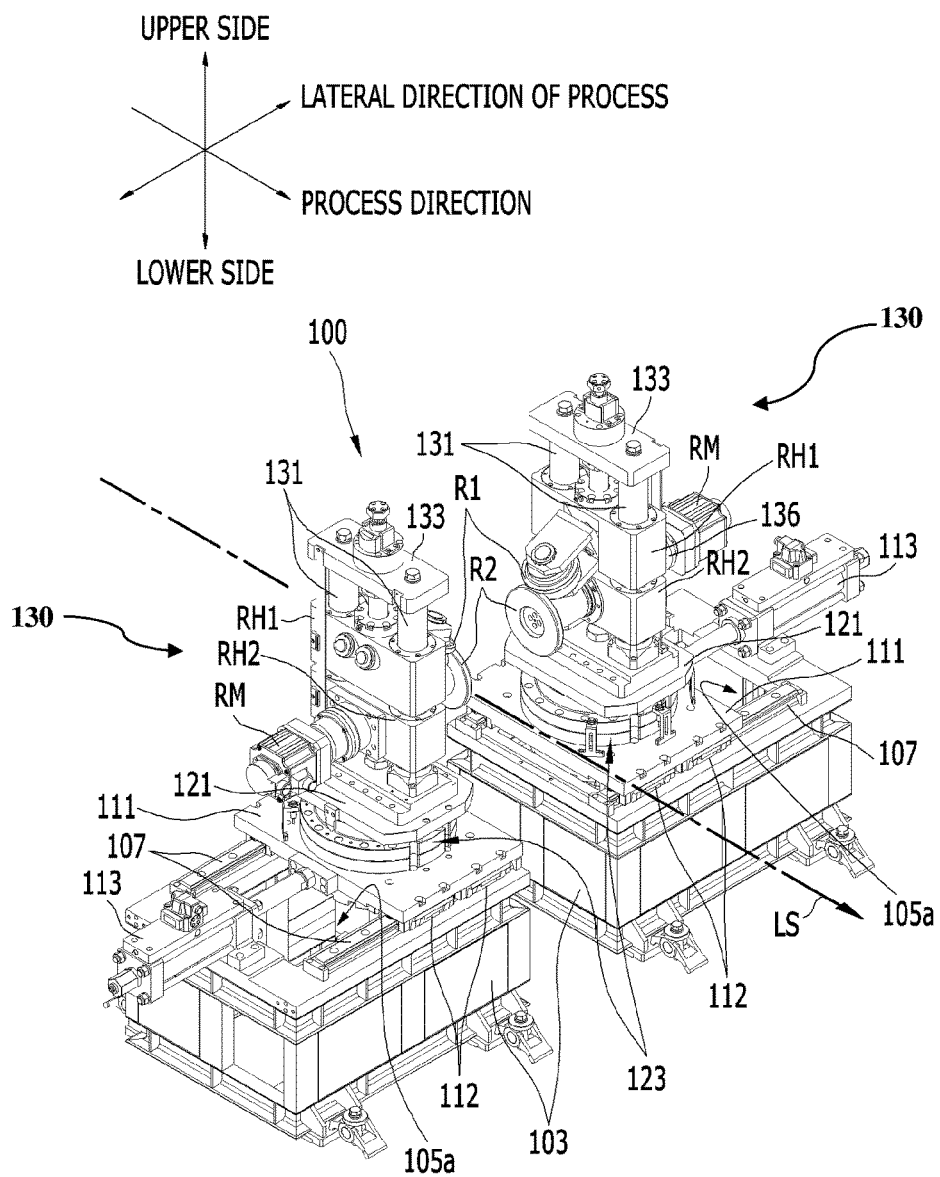
FIG. 2 illustrates a perspective view of a flexible roll forming device in accordance with an exemplary embodiment of the present invention.
Figure 3:
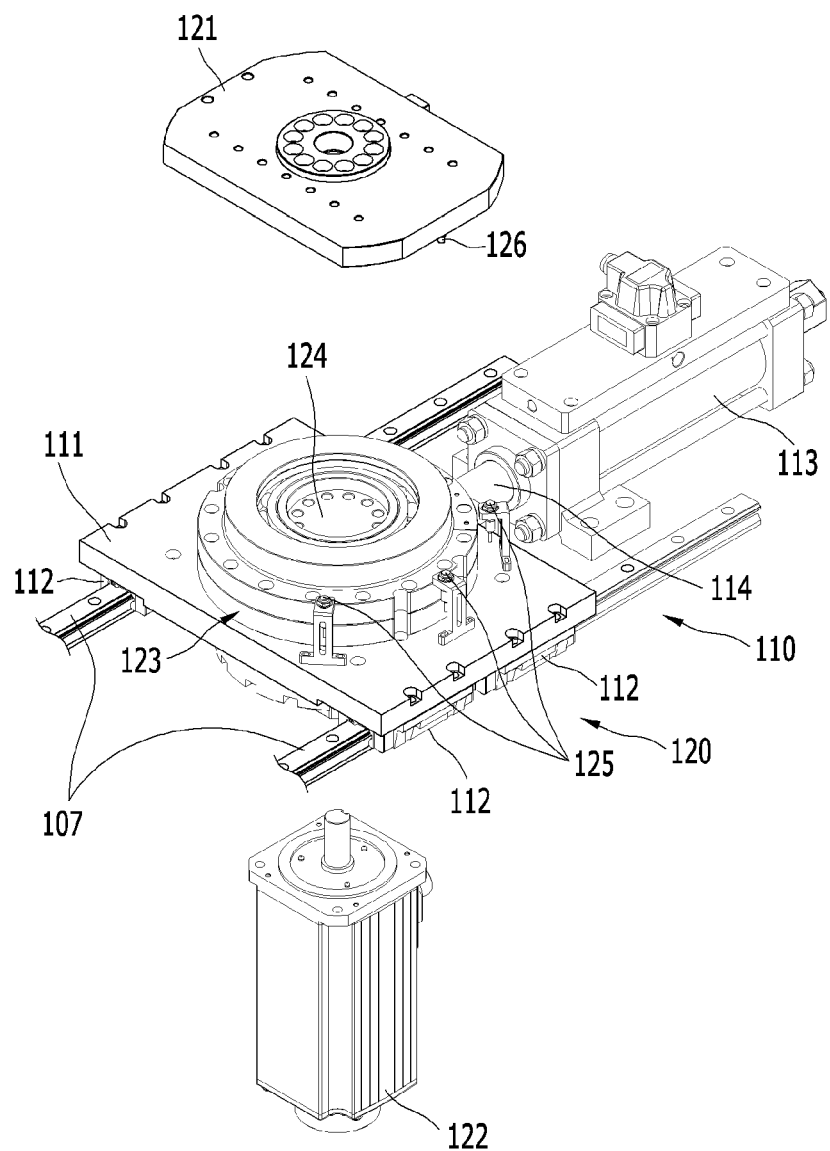
FIG. 3 is an exploded perspective view of a forward/backward moving means and a turning means applicable to a flexible roll forming device according to an exemplary embodiment of the present invention.
Figure 4:
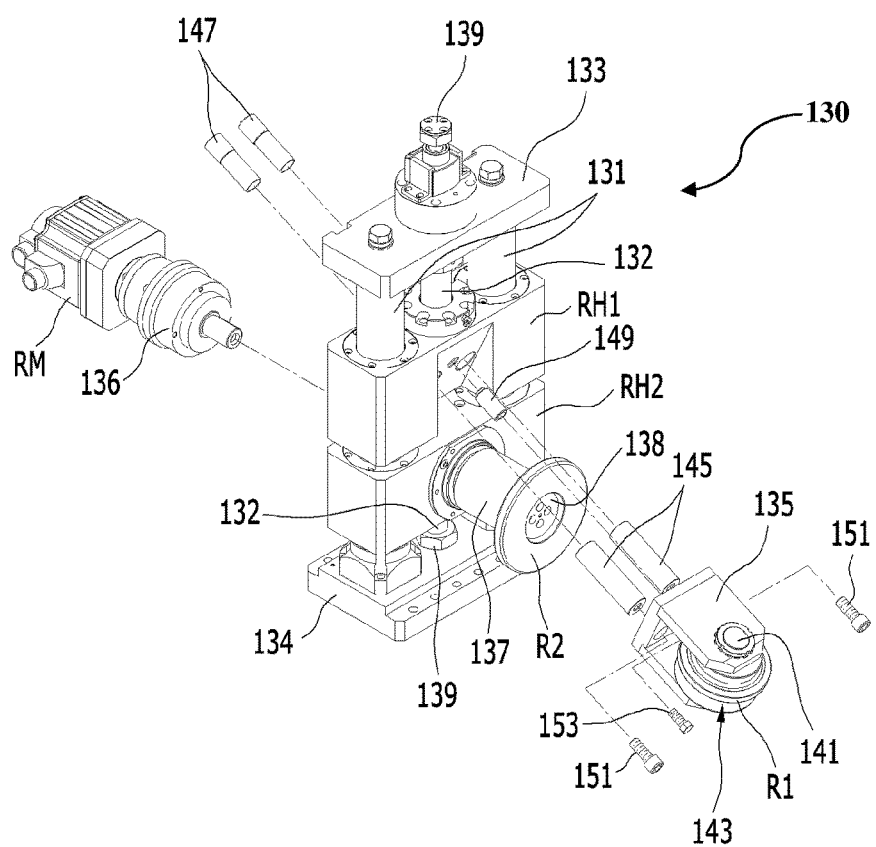
FIG. 4 is an exploded perspective view of a roll forming means applicable to a flexible roll forming device according to an exemplary embodiment of the present invention.

FIG. 2 illustrates a perspective view of a flexible roll forming device in accordance with an exemplary embodiment of the present invention, FIG. 3 is an exploded perspective view of a forward/backward moving means and a turning means applicable to a flexible roll forming device according to an exemplary embodiment of the present invention, and FIG. 4 is an exploded perspective view of a roll forming means applicable to a flexible roll forming device according to an exemplary embodiment of the present invention.

Referring to FIG. 2, basically, the flexible roll forming device 100 in accordance with an exemplary embodiment of the present invention uses a blank or a piece as a material (hereinafter, blank) thereof rather than a coil material.

Hereinafter, a process direction is a path in which the blank is processed to a flexible roll forming device 100. And a process width direction is a lateral direction of the process direction or a vertical direction of the process direction.

The flexible roll forming device 100 is provided with upper and lower forming rolls R1 and R2 symmetrically disposed on left/right sides of a process direction and both side upper and lower forming rolls R1 and R2 are disposed to be movable forward/backward in a lateral direction of the process and to vary angles from a process direction, respectively.

Figure 7:
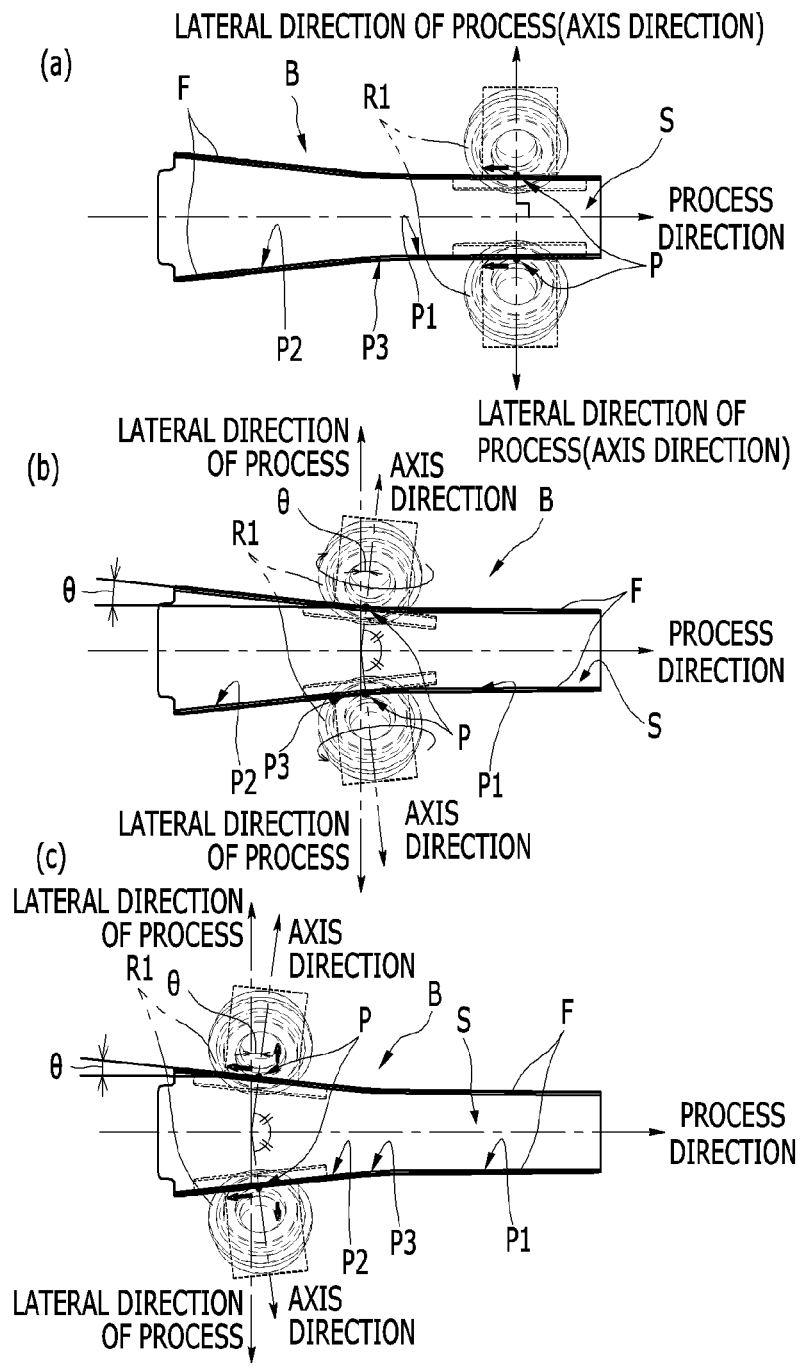
FIG. 7 illustrates operational schematic views of a flexible roll forming device according to an exemplary embodiment of the present invention.

Particularly, referring to FIG. 7, during forming flange bent from a blank B, each surface of the flange F and the blank B is in a rolling contact state with rollers R1 and R2, so that distortion of the blank B may be prevented.

In the specification and claims, a reference surface S of the blank B means a basic surface of the bank B and a flange F means a part of the reference surface S which are bent by roll forming.

The flexible roll forming device 100 according to an exemplary embodiment of the present invention will be described in detail.

Referring to FIG. 2 to FIG. 4, the flexible roll forming device 100 according to an exemplary embodiment of the present invention includes a base 103 symmetrically disposed on both sides of a center line LS of a process direction, with forward/backward moving means 110, turning means 120, and roll forming means 130 mounted thereon.

Each of the bases 103 has a space portion 105 formed therein, and an upper side opening 105a formed therein connected to the space portion 105.

The base 103 has rails 107 mounted on an upper side of both sides of the opening 105a in a lateral direction of a process.

The forward/backward moving means 110 includes a slide plate 111 movably provided along the rails 107 on the base 103.

The slide plate 111 is mounted on the rails 107 on the base 103 through a slider 112 to be movable in the lateral direction of the process.

A forward/backward moving cylinder 113 connected to the slide plate 111 with an operation rod 114 is mounted to one side of the base 103. If the forward/backward moving cylinder 113 moves forward or backward, the slide plate 111 moves in the lateral direction of the process.

The turning means 120 includes a turning reducer 123 mounted to a center of the slide plate 111, and a turning motor 122 mounted under the slide plate 111 connected to the turning reducer 123.

In this case, the turning motor 122 may be a servo motor which is reversible, and of which RPM and number of rotations are controllable.

The turning reducer 123 has a reducer shaft 124 having a turntable 121 mounted thereto for rotating the turntable 121 with a torque of the turning motor 122 transmitted through the turning reducer 123 at a reduced speed.

The turning motor 122 is disposed in the space portion 105 through the opening 105a in the base 103 for moving without interference with the base 103 when the slide plate 111 slidably moves in the lateral direction of the process of the base 103.

A sensing dog 126 is mounted on an underside of the turntable 121, and a plurality of sensors 125 for sensing the sensing dog 126 are mounted on the slide plate 111 at the turntable 121 to sense a home position and states of rotation limit positions of the turntable 121 in each direction with respect to the slide plate 111, and to forward a signal thereof to a controller (not shown).

In this case, although the sensor 125 may be a proximity sensor for sensing the sensing dog 126 when the sensing dog 126 comes within a predetermined range, the sensor 125 is not limited to this, and other sensing means such as a limit switch are applicable as long as the sensing means can sense a rotated position of the turntable 121 on the slide plate 111.

The roll forming means 130 is mounted on the turntable 121, for flexible roll forming of a material fed thereto as the upper and lower forming rolls R1 and R2 respectively mounted to the upper and lower roll housings RH1 and RH2 are rotated by one roll motor RM, while at the same time, varying positions and angles of the upper and lower forming rolls R1 and R2 by using the forward/backward moving means 110 and the turning means 120.

The roll forming means 130 includes a plurality of roll posts 131, upper and lower roll housings RH1 and RH2, a roll motor RM, upper and lower forming rolls R1 and R2, and adjusting bolts 132.

The roll posts 131 are coupled to the upper and lower plates 133 and 134 with bolts, and fixedly secured to the turn table 121 through the lower plate 134.

The upper and lower roll housings RH1 and RH2 are mounted on both sides of the roll posts 131 to be movable in up/down directions.

A roll reducer 136 is mounted to one side of the lower roll housing RH2, and the roll motor RM is connected to the roll reducer 136.

A roll shaft 137 is rotatably mounted to the lower roll housing RH2 passed therethrough, the roll shaft 137 is connected to the roll reducer 136, and the lower forming roll R2 is mounted to the roll shaft 137.

The lower forming roll R2 is coupled to the roll shaft 137 secured with a key, and a fixing plate 138 is fastened to a fore end of the roll shaft 137 for preventing the lower forming roll from falling off.

In this case, the roll motor RM may be a servo motor which is reversible and of which RPM and number of rotations are controllable.

The upper forming roll R1 is rotatably mounted to a rotation bracket 135 secured to the upper roll housing R1 with a slanted shaft 141, and the upper forming roll R1 has a forming surface 143 facing an outside surface and an outside circumferential surface of the lower forming roll R2.

The rotation bracket 135 is mounted to the upper roll housing RH1 in a tilted position with a plurality of mounting rods 145 with bolts 151, mounting bolts 147 respectively mounted to the mounting rods 145, and one center pin 149 fastened with a pin bolt 153 and then inserted in a pin hole in the upper roll housing RH1.

The adjusting bolts 132 are provided between the upper plate 133 and the upper roll housing RH1 and between the lower plate 134 and the lower housing RH2 for adjusting and securing positions of the upper and lower roll housings RH1 and RH2, respectively.

In this case, each of the adjusting bolts 132 has a fixing nut 139 fastened thereto for fixing the upper and lower roll housings RH1 and RH2 to the adjusted positions, respectively.

Eventually, the flexible roll forming device 100 described thus causes flexible roll forming of a material fed thereto as the upper and lower forming rolls R1 and R2 are rotated by the roll motor RM, while at the same time, varying positions in the lateral direction of the process and angles from the process direction of the upper and lower forming rolls R1 and R2 by operating the forward/backward moving means 110 and the turning means 120.

Figure 5:
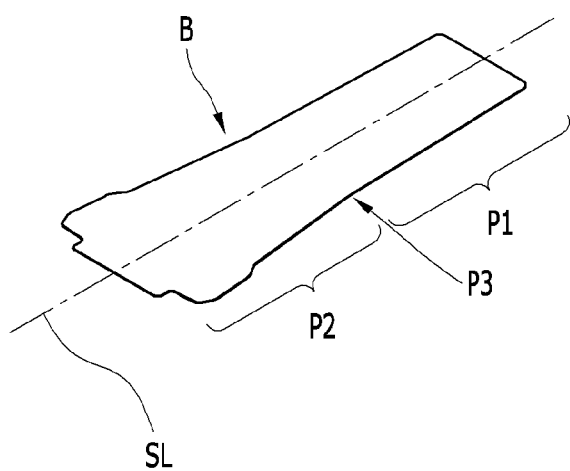
FIG. 5 illustrates a perspective view of an example of a material to be fed to a flexible roll forming device according to an exemplary embodiment of the present invention.

FIG. 5 illustrates a perspective view of an example of a material to be fed to a flexible roll forming device according to an exemplary embodiment of the present invention.

Referring to FIG. 5, basically, the material used in the flexible roll forming device 100 in accordance with an exemplary embodiment of the present invention is the blank material B of a predetermined standard. It is favorable for the blank to be symmetric in a left/right direction with respect to a length direction center line S taking formability into account.

That is, although forming is difficult if the blank material B has a large variation of a width along a length direction, the blank material B may have a width that varies along the length direction on the whole, and may include a straight portion P1 having a fixed width along the length direction, an expanded portion P2 having a width which becomes larger farther in the length direction, and a curve portion P3 connecting the straight portion P1 to the expanded portion P2 with a curved line.

The operation of the flexible roll forming device 100 in accordance with an exemplary embodiment of the present invention will be described with reference to FIGS. 6 to 8.

Figure 6:
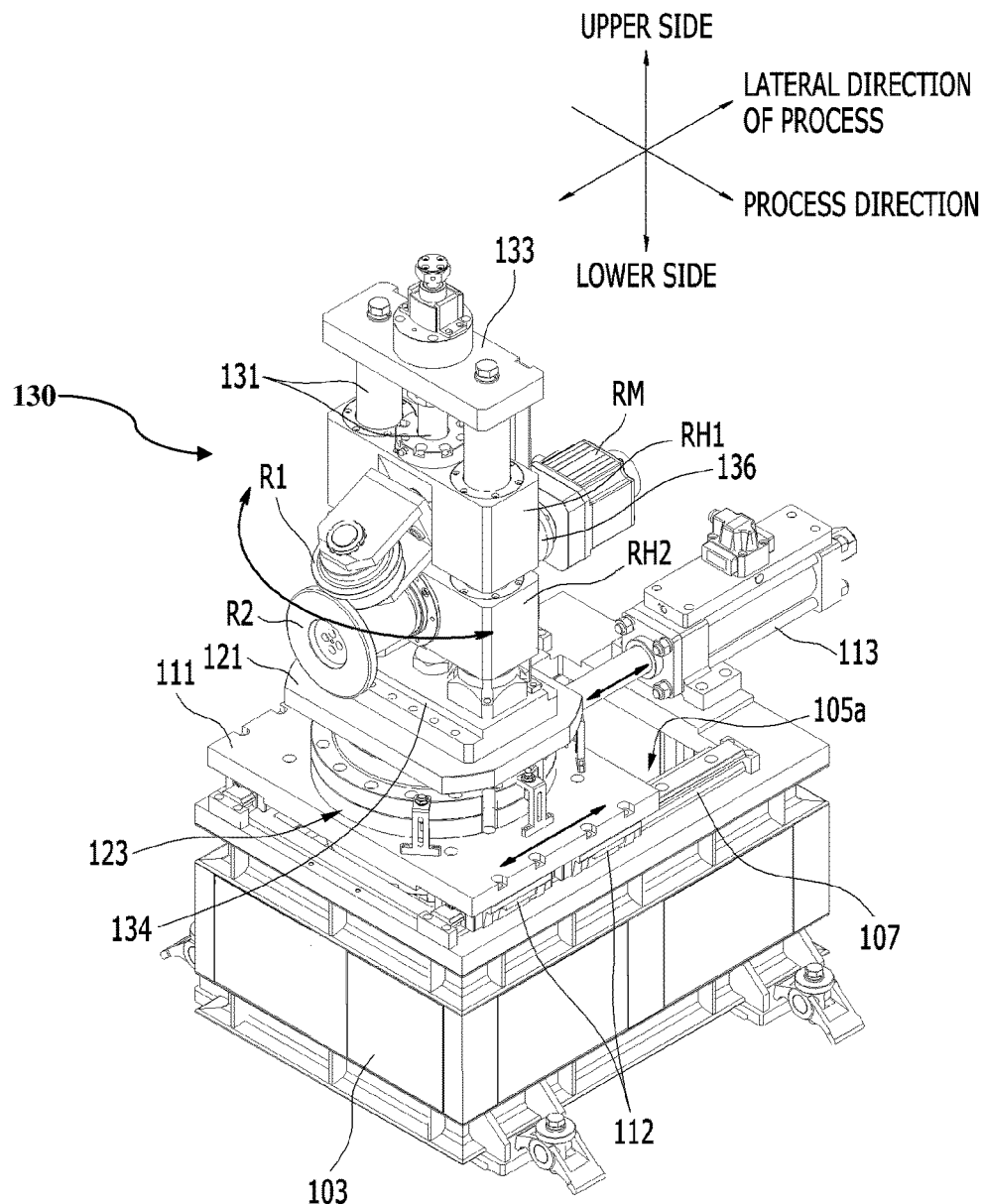
FIG. 6 illustrates a perspective view of a flexible roll forming device according to an exemplary embodiment of the present invention, showing operation thereof.
Figure 8:
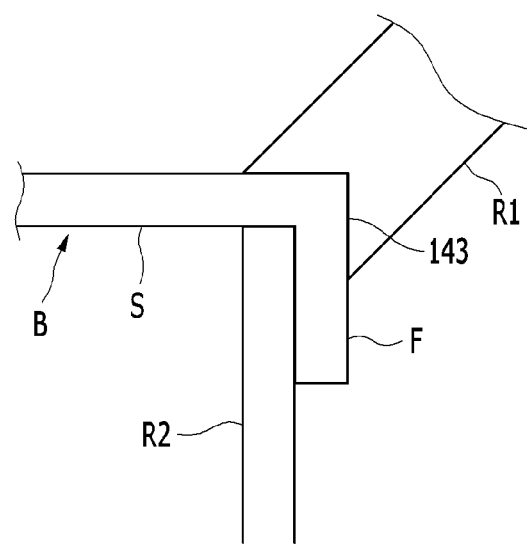
FIG. 8 illustrates upper and lower forming rolls of a flexible roll forming device according to an exemplary embodiment of the present invention.

FIG. 6 illustrates a perspective view of a flexible roll forming device according to an exemplary embodiment of the present invention, showing operation thereof, FIG. 7 illustrates operational schematic views of a flexible roll forming device according to an exemplary embodiment of the present invention, and FIG. 8 illustrates upper and lower forming rolls of a flexible roll forming device according to an exemplary embodiment of the present invention.

Referring to FIG. 6, the flexible roll forming device 100 may control the lateral direction position of the upper and lower forming rolls R1 and R2 to be varied with movement of the slide plate 111 along the opposite rails 107 on the base 103 as the forward/backward moving cylinder moves forward/backward.

The flexible roll forming device 100 may control an angle of the upper and lower forming rolls R1 and R2 from the process direction to be varied with turning of the turntable 121 with respect to the slide plate 111 as the turning motor 122 positioned in the space portion 105 of the base 103 mounted to the slide plate 111 through the turning reducer 123 turns.

The lower forming roll R2 receives torque from the roll motor RM rotate through the roll reducer 136, and then the upper and lower forming rolls R1 and R2 bend the material fed thereto as each surface of the flange F and the blank B is in a rolling contact state with the forming rolls R1 and R2.

The lower forming roll R2 is rotated by the operation of the one roll motor RM of the flexible roll forming device 100 and the upper forming roll R1 is rotated by the rotation of lower forming roll R2 interposing the blank B therebetween.

As shown in FIG. 8, between the forming surface 143 of the upper forming roll R1 and the outside surface and the outside circumferential surface of the lower forming roll R2, a part of the blank B is interposed therebetween, and then the flank F is formed by bending the blank B.

The flexible roll forming device 100 causes flexible roll forming of the material fed thereto as the positions in the lateral direction of the process and the angles from the process direction of the upper and lower forming rolls R1 and R2 are respectively varied with forward/backward movement of the slide plate 111 by the forward/backward moving cylinder 113 and turning of the turntable 121 by rotation of the turning motor 122.

Referring to FIG. 7, an example of the steps of roll forming with the flexible roll forming device 100 will be described, with reference to the blank material B in FIG. 5 having a straight portion P1, an expanded portion P2, and a curved portion P3.

That is, referring to FIG. 7 (a), in flexible roll forming of flanges F at the straight portion P1 of the blank material B, the opposite upper and lower forming rolls R1 and R2 are disposed to have fixed positions in the lateral direction of the process, and to have angles at a right angle to the process direction at the straight portion P1 of the blank material B for bending fixed widths of the edges of the straight portion P1 downward to cause roll forming of the flanges F, respectively.

Referring to FIG. 7 (b), the opposite upper and lower forming rolls R1 and R2 proceed to the curved portion P3 of the blank material B while having the fixed positions in the lateral direction of the process as they were and only varying the angles from the process direction up to an angle θ the same as the expanded portion P2 by rotating the motors 122 to cause roll forming of the fixed widths of the edges of the curved portion P3 into the flanges F.

Thereafter, referring to FIG. 7 (c), the opposite upper and lower forming rolls R1 and R2 proceed to the expanded portion P2 of the blank material B, and maintain the angles in the process direction the same as the angle θ of the expanded portion P2 as they were, while moving the positions P in the lateral direction of the process outward according to the edges of the expanded portion P2 by driving the forward/backward moving cylinders 113, to cause roll forming of the fixed widths of the opposite edges of the expanded portion P2 into the flanges F, to form a beam having different widths along the length direction and the flanges F by flexible roll forming.

If the formed beam B having the rectangular flanges F on opposite sides formed by the flexible roll forming is subjected to general roll forming to form rectangular opposite sides with respect to a length direction center line S of the blank, a 3D shape of the formed product having a modified cross-section with different widths and heights along the length direction owing to the expanded portion may be flexibly roll formed.

Eventually, vehicle body members, frames, and beams having cross-section profiles of which widths and heights are different from one another along the length direction can be roll formed as one unit with one roll forming event, permitting minimization of following steps, such as welding, jointing, and the like, and also contributing to manufacture of lighter vehicles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A flexible roll forming device comprising:
   at least two bases having a gap therebetween, each of which respectively disposed on opposite sides with respect to a process direction center line,
   a rail configured on each of the at least two bases along a lateral direction perpendicular to the process direction center line;
   a forward/backward moving means having a slide plate provided to be movable along the rail, and a forward/backward moving cylinder mounted on each of the at least two bases connected to the slide plate with an operation rod;
   a turning means rotatably provided on the slide plate on each of the at least two bases so as to provide an angular movement away from the process direction center line; and
   a roll forming means provided on the turning means to include an upper forming roll and a lower forming roll inclined with respect to the upper forming roll for subjecting a material fed thereto to flexible roll forming by using the upper and lower forming rolls while varying positions in the lateral direction with the forward/backward moving means, and angles from the process direction center line with the turning means,
   wherein the turning means further includes a turning reducer mounted to a center of the slide plate;
   a turning motor mounted under the turning reducer for supplying a torque; and
   a turntable mounted over the turning reducer so as to be turned by the torque from the turning motor.

2. The roll forming device of claim 1, wherein:
   mounted on the slide plate,
   for sensing a sensing dog mounted on one side of an underside of the turntable to sense a home position of the turntable with respect to the slide plate, and rotation limit positions in one direction and the other direction and forwarding a signal thereof.

3. The roll forming device of claim 1, wherein a space portion is formed within each of the at least two bases for the turning motor to be moved without interruption when the forward/backward is operated.

4. The roll forming device of claim 1, wherein:
the roll forming means includes:
upper and lower plates;
roll posts coupled to the upper and lower plates mounted to the turning means;
upper and lower roll housings mounted to the roll posts to be movable in up/down directions; and
a lower roll motor mounted to an outside of the lower roll housing connected to the lower forming roll passed through the lower roll housing.

5. The roll forming device of claim 4, wherein:
the upper forming roll is rotatably connected to a rotating bracket fixed to the upper roll housing through a slanted shaft, and has forming surfaces corresponding to an external circumferential surface and a side surface of the lower forming roll.

6. The roll forming device of claim 4, further comprising adjusting bolts
provided between the upper and lower plates and the upper and lower housings for adjusting and securing positions of the upper and lower roll housings, respectively.

* * * * *